United States Patent Office 2,746,986
Patented May 22, 1956

---

2,746,986

α-(META-HYDROXYPHENYL)-β-METHYLAMINO-ETHANOL CYCLOHEXYLSULFAMATE

Melville Sahyun and John A. Faust, Santa Barbara, Calif.; said Faust assignor to said Sahyun No Drawing. Application June 2, 1952,
Serial No. 291,326

2 Claims. (Cl. 260—501)

The present invention relates to α-(meta-hydroxyphenyl)-β-methylaminoethanol cyclohexylsulfamate and is more particularly concerned with the levo isomer thereof.

Heretofore it has been recognized the α-(meta-hydroxyphenyl)-β-methylaminoethanol possesses the physiological property of causing constriction of the blood vessels, particularly the mucosa. The compound has been marketed widely as a mineral acid salt, such as the hydrochloride salt, in dilute aqueous solution. Due to the inherent instability and the low pH of the amine in aqueous solution, it has been necessary to utilize various stabilizers and buffering agents to produce compositions which are resistant to light and do not sting when applied to the nasal passages. In addition, the solutions of this compound are bitter to the taste and require the use of sterilization preservatives. These efforts have not been entirely successful.

Therefore, it is an object of the present invention to provide a stable α-(meta-hydroxyphenyl)-β-methylaminoethanol-type compound, whose aqueous solution is self-sterilizing, non-irritating and is not bitter to the taste.

Another object of the present invention is to provide the cyclohexyl sulfamic acid salt of α-(meta-hydroxyphenyl)-β-methylaminoethanol.

These and other objects of the present invention will be apparent to those skilled in the art to which this invention pertains.

Thus, the present invention comprises the novel, stable α-(meta-hydroxyphenyl)-β-methylaminoethanol cyclohexylsulfamate and a method of preparing this compound, which exhibits excellent vasoconstrictor qualities. An aqueous solution of about one-quarter to one or more percent may be very satisfactorily employed as a nasal irrigant. The aqueous solutions are characterized by their non-irritating and pleasant tasting qualities. These solutions do not discolor upon prolonged exposure to air and are completely self-sterilizing so that no preservatives are required. The pH of a one percent aqueous solution is approximately 6.2, the employment of buffers, heretofore used, thus being conveniently obviated. In addition, the levo isomer per se is more stable than the hydrochloride salt of the α-(meta-hydroxyphenyl)-β-methylaminoethanol.

The compound of the present invention is prepared by reacting approximately equimolar quantities of the levo-α-(meta-hydroxyphenyl)-β-methylaminoethanol base with cyclohexyl sulfamic acid in the presence of an appropriate organic solvent, preferably methanol. The reaction product is recovered as a crystalline solid by fractional crystallization, or other appropriate procedure, from organic solvents, such as isopropanol or from mixtures such as isopropanol-ether combined solvents. Yields of at least eighty percent are successfully achieved.

The following example illustrates in greater detail the practice of the present invention but is not to be construed as limiting the same.

EXAMPLE

*Levo-α-(meta-hydroxyphenyl)-β-methylaminoethanol cyclohexylsulfamate*

Levo-α-(meta-hydroxyphenyl)-β-methylaminoethanol was prepared from α-(meta-hydroxyphenyl)-β-methylaminoethanol hydrochloride (melting point 142–143 degrees centigrade; $(\alpha)_D^{24} - 42$) by treatment with excess ammonia and subsequent isolation of the product as fine white crystals.

Three and thirty-four hundredths (3.34) grams (0.02 mole) of levo-α-(meta-hydroxyphenyl)-β-methylaminoethanol base and 3.59 grams (0.02 mole) of cyclohexylsulfamic acid were admixed and the resulting reaction mixture dissolved in twenty milliliters of warm ethanol. The resulting solution was concentrated to an oily residue by vacuum distillation, the oily matter slowly crystallizing. The resulting crystalline solid was dissolved in twenty milliliters of isopropanol and the solution diluted with ether, a slight turbidity being exhibited. Upon standing, a solid separated and was recrystallized from an isopropanol-ether mixture. Five and one-half grams (an eighty percent yield) of levo-α-(meta-hydroxyphenyl)-β-methylaminoethanol sulfamate melting at 113–115 degrees centigrade was obtained as white, non-hygroscopic needles. The product exhibited a molecular weight of 346.44 and was soluble to the extent of forty percent in water at twenty degrees centigrade. It exhibited a pH of 6.2 in a one percent aqueous solution.

The specific rotation was $(\alpha)_D^{24} - 27$ in a 2.5 percent aqueous solution.

*Analysis.*—Calculated for $C_{15}H_{26}N_2O_5S$: N 8.09. Found: 8.29.

Various modifications may be made in the present invention without departing from the spirit or scope thereof and it is to be understood that we limit ourselves only as defined in the appended claims.

We claim:

1. Levo-α-(meta-hydroxyphenyl)-β-methylaminoethanol cyclohexylsulfamate.

2. The process which comprises: admixing equimolar quantities of levo-α-(meta-hydroxyphenyl)-β-methylaminoethanol and cyclohexylsulfamic acid; and isolating the levo-α-(meta-hydroxyphenyl)-β-methylaminoethanol cyclohexylsulfamate from the reaction product.

References Cited in the file of this patent

UNITED STATES PATENTS

| | | |
|---|---|---|
| 2,275,125 | Audrieth et al. | Mar. 3, 1942 |
| 2,275,809 | Roberts | Mar. 10, 1942 |
| 2,369,711 | Blythe | Feb. 20, 1945 |